United States Patent [19]
Wendland et al.

[11] 3,980,830
[45] Sept. 14, 1976

[54] COMPATIBLE PICTUREPHONE SYSTEM

[75] Inventors: Broder Wendland, Ay; Iller; Franz May, Ulm (Danube), both of Germany

[73] Assignee: Licentia Patent-Verwaltungs-G.m.b.H., Frankfurt am Main, Germany

[22] Filed: May 2, 1975

[21] Appl. No.: 574,242

[30] Foreign Application Priority Data
May 3, 1974 Germany............................ 2421444

[52] U.S. Cl.................................. 179/2 TV; 178/6
[51] Int. Cl.² .................... H04M 11/00; H04N 7/14
[58] Field of Search ....................... 179/2 TV; 178/6

*Primary Examiner*—George G. Stellar
*Attorney, Agent, or Firm*—Spencer & Kaye

[57] ABSTRACT

A system for permitting compatible communications among broadband and narrowband picture telephone installations, the bandwidth of a narrowband installation corresponding to the lower portion of the bandwidth of a broadband installation, in which the pictures associated with both types of installations have the same number of lines, the same line scanning frequency and the same frame rate, both the scanning of the subject image and playback are effected with a wave-shaped line scan for playback in a broadband installation, the signals in the transmitting portion of a broadband installation are split into a low frequency component, covering a bandwidth corresponding to that of a narrowband installation, and a high frequency component, and both components transmitted from a broadband installation are recombined in the receiving portion of a further broadband installation receiving the transmitted signals.

7 Claims, 8 Drawing Figures

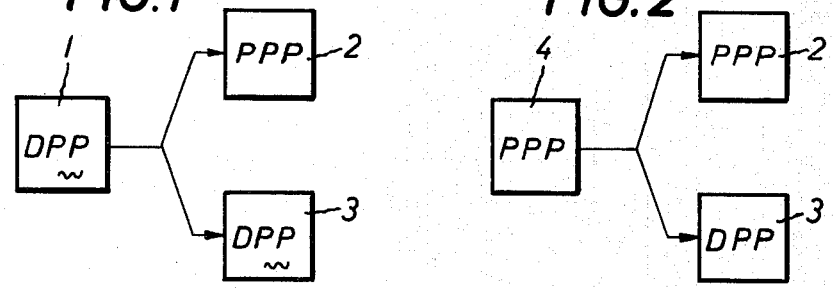
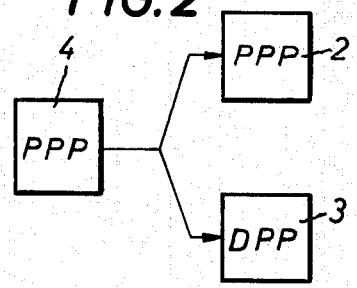
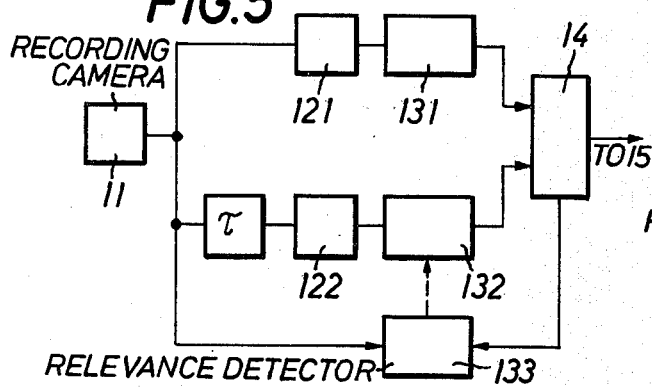
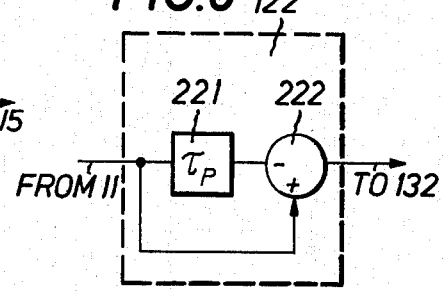
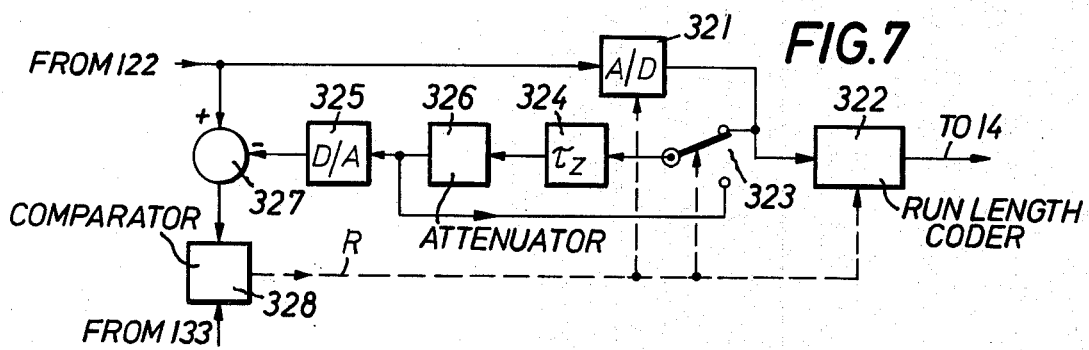
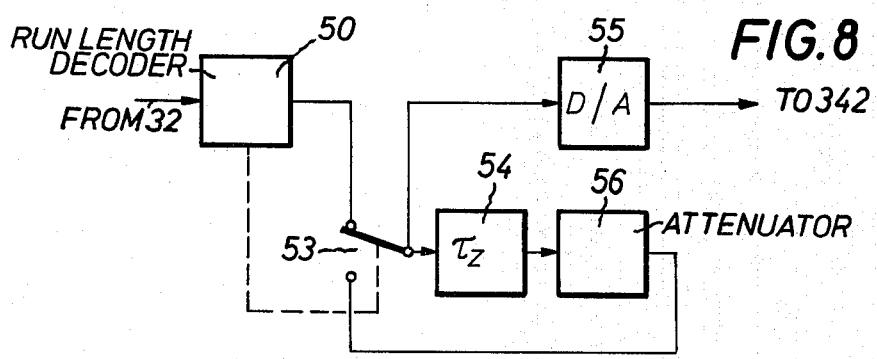

COMPATIBLE PICTUREPHONE SYSTEM

BACKGROUND OF THE INVENTION

The present invention relates to a compatible picture telephone system for the digital transmission of narrowband video signals from a narrowband system and broadband signals from a broadband system, narrowband or broadband picture recording and playback instruments being selectively connected thereto depending on the desired quality of picture reproduction.

The Bell Laboratories has developed a videophone, or "Picturephone," the latter being a trademark owned by the Bell System, which is a narrowband picture telephone system which has a satisfactory picture resolution for the display of the image of a person's face. This system operates with a 267-line picture and a line scanning frequency of 8 KHz and requires a transmission bandwidth of 1 MHz. Such a system is described in the Bell Technical Journal, Volume 50, 1971, at pages 235–269.

If this system is to be used for data or information transmission purposes, however, such picture resolution is not sufficient. For example, the known system is able to transmit legibly only about one eighth of the area of a typewritten page of the size specified by DIN A4.

Picture telephone systems have been proposed which operate with a greater number of lines, a higher line scanning frequency and a greater transmission bandwidth and which produce a resolution corresponding to up to one-half of a DIN A4 typewritten page. Such a system is described in IEEE SPECTRUM, Nov. 1973, at pages 45–49.

There thus exists the drawback that a number of independent picture telephone systems coexist which are not compatible with one another. Without the intermediary of complicated instruments, such as line converters, for example, it is impossible to effect picture telephone conversations between users employing such different picture telephone systems.

SUMMARY OF THE INVENTION

It is an object of the present invention to eliminate this drawback in the state of the art.

It is a more specific object of the invention to provide a picture telephone system which is able to record and play back narrowband signals from a facial image, or portrait, Picture Phone, hereinafter abbreviated as PPP, as well as broadband signals from a data picture telephone, hereinafter abbreviated as DPP, while being as inexpensive as possible.

These and other objects of the invention are achieved by a compatible picture telephone system for the digital transmission of narrowband video signals from a narrowband system and broadband signals from a broadband system, the compatible system being selectively connectable to narrowband or broadband picture recording and playback instruments, depending on the desired quality of picture reproduction. The system according to the invention is characterized by the fact that the number of picture lines, the line scanning frequency and the frame rate are the same in the narrowband system as in the broadband system and waveshaped line scanning is employed both in the video camera and during playback of a picture in a broadband system. In addition, the broadband video signals which are produced by a picture recording system of the broadband system are split, before they are coded, into low frequency and high frequency video signals, in a manner disclosed in the Journal of the SMPTE, Volume 68, August, 1959, pages 525–527, the coded low frequency signals are the coded signals from the narrowband system, and the coded high frequency signals are merely relevant signals which, when decoded and combined with the low frequency signals produce the video signal of the broadband system.

The system permits the exchange of data between any desired users of PPP and DPP systems. No frequency or picture converters are required. No additional equipment is needed by PPP users, while the additional expenses for DPP users are low. The system can be realized very simply and permits conference connections between PPP and DPP users.

According to one embodiment of the invention, the relevant signals are difference signals based on adjacent picture points and are selected in a known manner by a relevance detector.

A coder which codes the relevant difference signals in amplitude and location permits effective data compression of the high frequency signals.

In accordance with a further feature of the invention, the volume of the relevance signal from the relevance detector is controllable so that a signal obtained from a buffer memory at the transmitting end and indicating the degree of fill of the buffer memory keeps the average number of coded high frequency signals constant, thus assuring a uniform data supply as high frequency signals averaged over time.

In a particular embodiment of the invention, components are provided which control the coding of the difference signals so that the difference signals are coded and transmitted only if they differ from the quantized difference signal of the preceding picture line by more than a threshold amount given by the relevance detector. This leads to a further data compression of the high frequency signals so that there is obtained either improved picture quality or a saving in transmission bandwidth.

In order to suppress noise signals and to prevent the number of coded relevant signals from being undesirably increased by noise signals, a further embodiment of the present invention provides a predictor which generates quantized difference signals from the preceding picture line and the predictor has a predictor coefficient which is reduced, by an attenuator disposed in the predictor loop, to less than one. This measure serves to eliminate undesired vertical picture shapes of low signal amplitudes which would be incompletely eliminated in the predictor during the transition from high detail to low detail picture areas if there were no attenuator.

BRIEF DESCRIPTION OF THE DRAWING

FIG. 1 is a block circuit diagram of the configuration of a system according to the invention during the connection between a DPP user and a PPP or DPP user.

FIG. 2 is a block circuit diagram of the configuration of a system according to the invention for connection between a PPP user and a PPP or DPP user.

FIG. 5 is a block circuit diagram of an improved embodiment of a signal processor at the transmitter of a broadband installation according to the invention.

FIG. 6 is a block circuit diagram of one embodiment of one device of the circuit of FIG. 5.

FIG. 7 is a block circuit diagram of a coder for coding relevant high frequency signals in the circuit of FIG. 5.

FIG. 8 is a block circuit diagram of a decoder for relevant high frequency signals at the receiving end of a broadband installation according to the invention.

DESCRIPTION OF THE PREFERRED EMBODIMENTS

FIG. 1 is a simplified illustration of a connection between a DPP 1 and a PPP 2 or DPP 3, respectively. Picture recording and playback take place, according to the present invention, with the same number of lines, line scanning frequency and frame rate. However, in accordance with the disclosure of U.S. Pat. No. 3,792,196, issued Feb. 12, 1974, the scanning of the picture in the DPP is effected with wave-shaped scanning lines in the recording camera as well as in the playback device in that a small amplitude, high frequency deflection is imparted to the scanning beam, in addition to the horizontal deflection, and this vertical deflection is synchronized in the recording camera and in the playback device and serves to increase resolution. The transmission is broadbanded. The called user of DPP 3 can thus receive a picture with high resolution. The called user of PPP 2 continues to receive a picture which corresponds to the PPP resolution.

FIG. 2 is a simplified illustration of a connection between a PPP 4 and either a PPP 2 or a DPP 3. This transmission produces no difficulties since, according to the present invention, all Picture Phones operate with the same number of lines, line scanning frequency and frame rate. The picture quality at the playback instrument of the DPP 3 corresponds in this case to the picture quality of the PPP 2. The wave shape in the scanning lines is not required in this case; neither is it annoying. In the described examples of connection, the PPP's never employ a wave shaped line trace during recording and playback.

Figure 3:
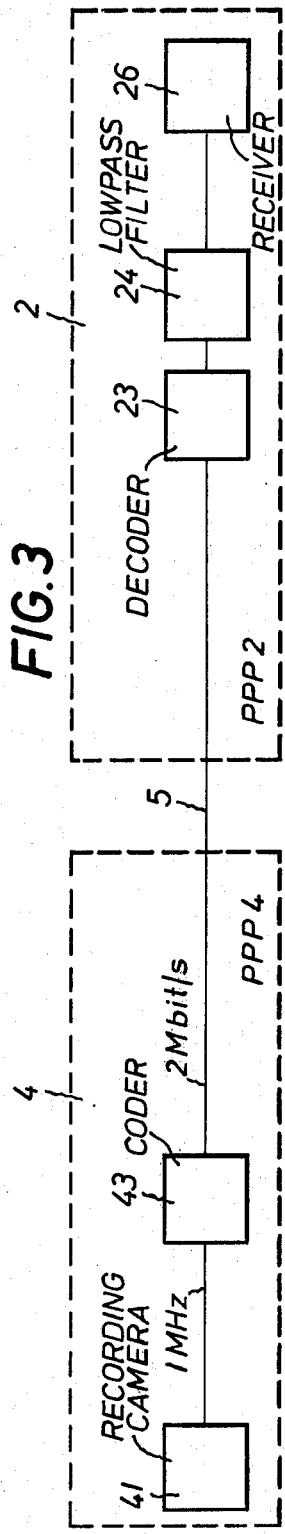
FIG. 3 is a block circuit diagram of an embodiment of a PPP transmission system.

FIG. 3 shows an embodiment of a system for communication between two PPP's, e.g., PPP 4 and PPP 2 of FIG. 2. The video signals from the recording camera 41 of PPP 4, with a bandwidth of, for example, 1 MHz, are coded, for example by an intraframe coder, to PCM signals with 4 Mbit/s ($4 \times 10^6$ bits/second). In a second stage an interframe coder may effect a signal reduction to 2 Mbit/s. This type of data compression is here combined and takes place in a coder 43. An example is described in the Proceedings 1972 IEEE, Int. Conf. on Communications, Philadelphia, 39/1 – 39/6. (Videotransmission with intraframe DPCM and optional interframe coding) W. Thoma.

The output signal from coder 43 is transmitted via a transmitting channel 5 to PPP 2. In PPP 2 the received signal is reconverted to a video signal in a decoder 23 and lowpass filter 24 and the video signal is played back by a playback instrument, or receiver, 26. The transmission takes place according to a known technique, for example the channel 5 being a PCM path in the form of a coaxial cable.

Figure 4:
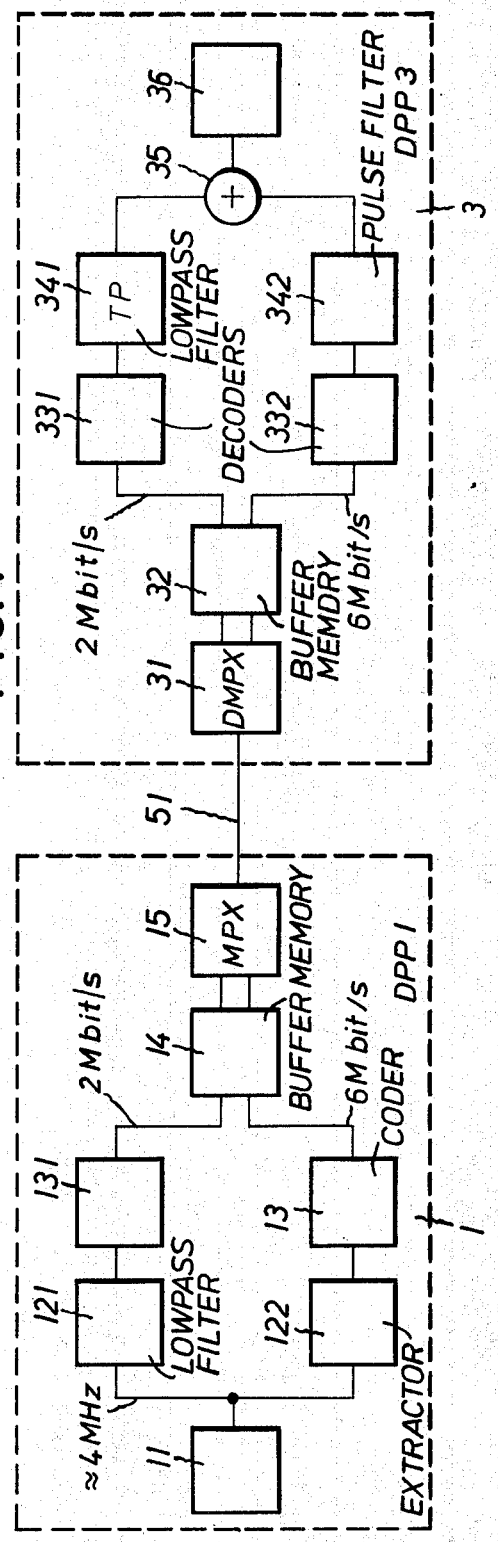
FIG. 4 is a block circuit diagram of an embodiment of a DPP transmission system according to the invention.

FIG. 4 shows an example for the transmission between two DPP's for example between DPP 1 and DPP 3 of FIG. 1. In this case, the broadband video signal, with a bandwidth between 3 and 5 MHz, for example, of a recording camera 11 is divided into a low frequency signal and a high frequency signal.

The low frequency signal is limited by a lowpass filter 121 to the bandwidth of the PPP, i.e., to about 1 MHz, and is coded in a coder system 131. The output signals from coder 131 are identical to the coded signals from PPP, i.e., from the narrowband system. Coders 131 and 43 are identical and perform the same functions.

The video signal from the recording camera 11 also reaches an extractor 122 which detects high frequency signals.

The signals from extractor 122 are evaluated in a coder 13 so that only relevant high frequency signals are being coded. A suitable coder 13 is disclosed, for example in U.S. Pat. No. 3,772,458. If the transmission channel 51 is narrow-banded, only the output signal from coder 131 is transmitted. If, however, the transmission channel permits a higher bit rate, the coded high frequency signal is regularly discharged together with the low frequency signal via a buffer memory 14 and is transmitted in time multiplex by a multiplexer 15, a first time slot being used, for example, to transmit the bits of the low frequency signal for PPP and three further time slots being used to transmit the bits of the high frequency signals without the low frequency component at a bit rate of, for example, 8 Mbit/s.

At the receiving end, the PCM signals from the transmission channel are separated in a demultiplexer 31 and transferred to a buffer memory 32. An example for the embodiments of such multiplexers 15, demultiplexers 31 and buffer memories 14 and 32 is given in U.S. Pat. No. 3,772,458, FIG. 7.

The low frequency signals are decoded by a decoder 331 as in the PPP system and are reconverted in a series-connected lowpass filter 341 into the video signal for a PPP. The decoder 331 of FIG. 4 and the decoder 23 of FIG. 3 can be identical.

Suitable multiplexers 15 and demultiplexers 31 are sold, for example, by the firm Texas Instruments. Suitable devices are, for example the TTL circuits SN 74 S157 and SN 74 S155.

In addition, a decoder 332 decodes the high frequency signals in the DPP system and a pulse filter 342 shapes the high frequency signals so that they, together with the low frequency signals, produce a video signal with perfect amplitude and phase. Pulse filter 342 may be in the form of, for example, the "Synthetic Highs Generator" described in the Journal of the SMPTE, August, 1959, page 529. A suitable decoder 332 is disclosed in U.S. Pat. No. 3,772,458, at column 4, lines 13 to 24.

The low frequency video signals and the high frequency components are combined in adder 35 and produce the broadband video signal for the playback device 36 of DPP 3. The process of separate transmission of high frequency picture components and recombination thereof at the receiving end is described in detail in the above-cited Journal of the SMPTE, Volume 68, August, 1959, pages 525–537.

FIG. 5 shows a further advantageous embodiment of the present invention. In order to assure a uniform transmission rate for the high frequency signals, a controllable relevance detector 133 is provided which selects high frequency signals in dependence on their relevance. The relevance detector controls coder 132. The selection criterion for the relevance detector is influenced by a control signal which indicates the degree of fill of buffer memory 14 so that the average number of coded high frequency signals remains constant. A suitable controllable relevance detector with control by a buffer memory is disclosed, for example, in German Offenlegungsschrift (Laid-Open Application) No. 2,326,644, corresponding to British application No. 23,680/74. The delay member ahead of the extractor 122 is used to compensate the calculation time of the relevance detector 133.

FIG. 6 shows a simple embodiment of an extractor 122 for producing the high frequency signals. It includes a known difference stage which forms the difference signals representing the difference between adjacent picture dots in a line. The delay member 221 delays a picture dot signal by the space of a picture dot. The subsequent subtraction member 222 forms the desired difference signal.

The coder 132 may advantageously be a coder which codes the relevant difference signal from extractor 122 with respect to both amplitude and location. A run length coder having the form disclosed, for example, in U.S. Pat. No. 3,772,458 issued Nov. 13, 1973, at column 2, lines 64, et seq., is suitable for this purpose. The coder 132 also includes an additional interframe stage which effects signal reduction to 6 Mbit/s.

FIG. 7 is a block circuit diagram of an intraframe stage in coder 132 which advantageously utilizes the correlation of picture dots which are perpendicular to the line direction. The difference signals emitted by extractor 122 reach an analog/digital converter 321 which is operated under the control of a relevance signal R. The digitalized and quantized values produced by A/D converter 321 are coded by a run length coder 322, which also receives the relevance signal R, and transmitted to buffer memory 14.

Furthermore, the relevance signal controls a switch 323 which is switched into a first state to transmit each digital signal emitted by the A/D converter 321 to a delay member 324 and which is switched into a second state during the rest of the time to cause the delay member 324 to form part of a predictor. In this latter case the output of delay member 324 is connected with its input via an attenuator 326 and switch 323. The delay time of delay member 324 is equal to the spacing in time between two successive picture lines.

The input of attenuator 326 of FIG. 7 is connected directly to the output of delay member 324. The attenuator reduces the digital values received at its input by a given amount, for example by one unit. The predictor coefficient of the predictor loop is thus less than one. A relevant signal at the lowest level fed to the predictor is thus not transmitted by attenuator 326 so that signals resulting from noise are advantageously suppressed and thus the number of coded relevant signals is not increased in an undesirable manner. Undesirable vertical picture shapes of low signal amplitudes are also prevented in this way, which could be eliminated only incompletely in the predictor during transition from high detail to low detail picture areas if the attenuator were not provided.

The digital output signals of attenuator 326 are converted back into analog signals by a D/A converter 325 and these analog signals are fed to the inverting input of a subtraction member 327, the difference signals emitted by extractor 122 being fed to the noninverting input of subtraction member 327.

With this circuit, only nonredundant difference signals from the extractor appear at the output of the subtracting member 327. They are compared in a comparator 328 with the threshold voltages formed by relevance detector 133 and when the threshold is exceeded they cause the relevance signal R at the output of the comparator to control the A/D converter 321, switch 323 and run length coder 322. The operation of the attenuator 326 can, e.g., be performed by a PROM for example MMI 6,300 available by Monolithic Memory Corporation.

A suitable run length coder is, e.g., described in U.S. Pat. No. 3,772,458. The control function of the relevance signal R is effected in the following manner: suppose, the output signal of the subtracting member 327 exceed the threshold formed by the relevance detector 133. Now the relevance signal R induces the A/D conversion of the difference signal from the extractor 122 and the digital codeword will be run length coded and fed to the delay member 324 (shown switch position in FIG. 7).

If the output signal of the subtracting member 327 doesn't exceed the threshold, the corresponding difference signal from the extractor 122 will not be run length coded and switch 232 will be in opposite position.

In the above-described embodiment, the coding of the difference signal is controlled so that the difference signals are coded and transmitted only if they differ from the quantized difference signal of the preceding line by more than a threshold amount represented by the output of relevance detector 133.

FIG. 8 shows a decoder circuit 332 for decoding the high frequency signals in the receiving portion of DPP 3 of FIG. 4, the signals having been coded in the circuit of FIG. 7. The bits of the high frequency signals stored in buffer memory 32 at the receiving end are emitted by a run length decoder 50 in accordance with their address. At the same time, the run length decoder controls a switch 53 so that either the stored values are transferred into a predictor composed of a delay member 54, a series-connected attenuator 56 and a predictor loop which can be closed via switch 53, or previously transferred values are stored by the predictor. Elements 54 and 56 of the predictor have the same properties as the elements 324 and 326 which correspond thereto at the transmitting end.

The recovered digitalized difference signals present at the output of switch 53 are reconverted to analog signals by a D/A converter 55 and are conducted to the pulse filter 342 of FIG. 4. Further processing then takes place as described in connection with FIG. 4. This utilization of the correlation of the picture dots of adjacent lines permits either higher data compression or better picture quality, particularly for pictures with much detail. The run length decoder can be realized as described in U.S. Pat. No. 3,772,458.

The delay member 54 and the attenuator 56 of FIG. 8 are identical with the corresponding members, 324 and 326 in FIG. 7 and they perform the same functions. The switch 53, controlled by the reconstructed relevance signal from the run length decoder 50 acts in the same manner as switch 323 of FIG. 7. The D/A converter 55 converts the digital codewords at the input of delay member 54 into analog values. This values are fed to the pulse filter 342.

It will be understood that the above description of the present invention is susceptible to various modifications, changes and adaptations, and the same are intended to be comprehended within the meaning and range of equivalents of the appended claims.

What is claimed is:

1. In a compatible picture telephone system for the digital transmission of narrowband installation and broadband signals from a broadband installation, the system being selectively connectable to narrowband or broadband picture recording and playback installations, the improvement wherein the number of lines, the line scanning frequency and the frame rate are the same in the narrowband installation as in the broadband installation and the scanning of the subject image and playback of a picture are effected with a wave-shaped line scan for playback in the broadband installation, and said system comprises means for splitting the broadband video signals produced by the transmitter portion of a broadband installation before they are coded, into low frequency and high frequency video signals, the coded low frequency signals being identical to the coded signals produced by the transmitter portion of a narrowband installation, and the coded high frequency signals being relevant signals which, when decoded and combined with the low frequency signals in the receiving portion of a broadband installation, produce the video signal of the broadband installation.

2. An arrangement as defined in claim 1 further comprising at least one broadband installation including a transmitter portion and a receiver portion, and wherein said transmitter portion comprises a relevance detector connected to control the production of relevant signals in the form of signals representative of the difference between adjoining picture dots of a picture signal.

3. An arrangement as defined in claim 2 wherein said transmitter portion further comprises a coder connected for receiving signals proportional to the difference between adjacent picture dots and for deriving relevant signals in the form of coded signals representative of the amplitude and location of such difference signals, the output of said relevance detector being connected to control the operation of said coder.

4. An arrangement as defined in claim 3 wherein said transmitter portion further comprises a buffer memory connected to receive, and temporarily store, the coded signals produced by said coder, said buffer memory being arranged to produce a control signal indicating its degree of fill, and said relevance detector being connected to receive such control signal from said memory and to control said coder in dependence on such control signal for varying the rate of production of coded signals by said coder in a manner to maintain a uniform rate of transmission of relevant signals from said transmitter portion.

5. An arrangement as defined in claim 3 wherein said coder comprises means for controlling the coding of the difference signals associated with a given picture line for causing such difference signals to be coded and delivered from said coder only if they differ from the corresponding difference signals associated with the preceding picture line by more than a minimum value indicated by the output signal produced by said relevance detector.

6. An arrangement as defined in claim 5 wherein said means in said coder include a predictor comprising an attenuator member providing a predictor coefficient of less than unity, said predictor providing a representation of the coded difference signals of such preceding picture line.

7. In a compatible picture telephone system including a narrowband picture transmitting installation for effecting digital transmission of narrowband video signals, a broadband picture transmitting installation for effecting digital transmission of broadband signals, a narrowband picture playback installation, a broadband picture playback installation, and means for selectively interconnecting either transmitting installation with either playback installation, the improvement wherein each said broadband installation is constructed to operate with the same number of lines, line scanning frequency and frame rate as each said narrowband installation, said broadband transmitting installation effects a wave-shaped line scanning of the subject image, said broadband playback installation effects playback of a picture with a wave-shaped line scan, and said broadband transmitting installation comprises means for splitting the broadband video signals produced therein, before they are coded, into low frequency and high frequency video signals, the coded low frequency signals being identical to the coded signals produced by said narrowband transmitting installation, and the coded high frequency signals being relevant signals which, when decoded and combined with the low frequency signals in said broadband playback installation, produce a broadband video signal.

* * * * *